(12) United States Patent
Gallé

(10) Patent No.: US 11,904,526 B2
(45) Date of Patent: Feb. 20, 2024

(54) ADDITIVE MANUFACTURING SYSTEM AND METHOD (71) Applicant: 8098549 CANADA INC., Montréal (CA)

(72) Inventor: Francesco Gallé, Verdun (CA)

( * ) Notice: Subject to any disclaimer, the term of this patent is extended or adjusted under 35 U.S.C. 154(b) by 470 days.

(21) Appl. No.: 16/630,970

(22) PCT Filed: Jul. 13, 2018

(86) PCT No.: PCT/CA2018/050859
§ 371 (c)(1),
(2) Date: Jan. 14, 2020

(87) PCT Pub. No.: WO2019/010586
PCT Pub. Date: Jan. 17, 2019

(65) Prior Publication Data
US 2020/0223129 A1 Jul. 16, 2020

Related U.S. Application Data (60) Provisional application No. 62/532,428, filed on Jul. 14, 2017.

(51) Int. Cl.
*B29C 67/00* (2017.01)
*B29C 64/118* (2017.01)
(Continued)

(52) U.S. Cl.
CPC .......... *B29C 64/118* (2017.08); *B29C 64/209* (2017.08); *B29C 64/295* (2017.08); *B33Y 10/00* (2014.12); *B33Y 30/00* (2014.12)

(58) Field of Classification Search
CPC .................. B29C 64/118; B29C 64/209
See application file for complete search history.

(56) References Cited

U.S. PATENT DOCUMENTS 5,121,329 A * 6/1992 Crump ............... B33Y 40/00
700/119
7,942,987 B2 5/2011 Crump et al.
(Continued)

FOREIGN PATENT DOCUMENTS

CA 2241597 A1 7/1997
EP 967067 A1 * 12/1999 ........... B29C 64/106
(Continued)

OTHER PUBLICATIONS

Y. Cui, C.L. Xu, Q. Han, Effect of ultrasonic vibration on unmixed zone formation, Scripta Materialia, vol. 55, Issue 11, 2006, pp. 975-978, ISSN 1359-6462, https://doi.org/10.1016/j.scriptamat.2006.08.035. (https://www.sciencedirect.com/science/article/pii/S135964620600621X) (Year: 2006).*
(Continued)

*Primary Examiner* — Ryan M Ochylski (57) ABSTRACT

An additive manufacturing method and system comprising: a nozzle having a nozzle sidewall defining a central channel for allowing a deposition material filament to be dispensed therethrough on a workpiece; a heat source operatively coupled to the nozzle for melting the deposition material filament dispensed through the nozzle to form an additive material layer on a top surface of the workpiece; and an ultrasonic wave generator for providing ultrasonic waves into the melted deposition material in order to break up the oxide layer around the melted deposition material and bond the additive material layer to the workpiece.

28 Claims, 8 Drawing Sheets

(51) Int. Cl.
*B29C 64/295* (2017.01)
*B29C 64/209* (2017.01)
*B33Y 10/00* (2015.01)
*B33Y 30/00* (2015.01)

(56) References Cited

U.S. PATENT DOCUMENTS

| | | | |
|---|---|---|---|
| 9,027,378 B2 | 5/2015 | Crump et al. | |
| 9,956,640 B2 | 5/2018 | Burke et al. | |
| 10,029,406 B2 | 7/2018 | Burke et al. | |
| 10,086,467 B2 | 10/2018 | Burke et al. | |
| 10,232,443 B2 | 3/2019 | Myerberg et al. | |
| 10,335,889 B2 | 7/2019 | Burke et al. | |
| 2012/0121748 A1* | 5/2012 | Planta Torralba | B05C 17/00546 425/174.2 |
| 2014/0048969 A1* | 2/2014 | Swanson | B33Y 10/00 264/129 |
| 2015/0183164 A1* | 7/2015 | Duty | B29C 64/106 425/3 |
| 2016/0046073 A1* | 2/2016 | Hadas | B29C 48/345 264/211.21 |
| 2016/0136885 A1* | 5/2016 | Nielsen-Cole | B29C 64/209 425/462 |
| 2016/0167156 A1* | 6/2016 | Burke | B29C 64/386 219/74 |
| 2016/0185040 A1* | 6/2016 | Costlow | B29C 64/245 264/40.5 |
| 2016/0199158 A1* | 7/2016 | Heymann | B29C 39/22 264/16 |
| 2017/0113405 A1* | 4/2017 | Gandhi | B29C 64/393 |
| 2017/0173692 A1 | 6/2017 | Myerberg et al. | |
| 2017/0173693 A1 | 6/2017 | Myerberg et al. | |
| 2017/0173694 A1 | 6/2017 | Myerberg et al. | |
| 2017/0173695 A1 | 6/2017 | Myerberg et al. | |
| 2017/0173697 A1 | 6/2017 | Myerberg et al. | |
| 2017/0173877 A1 | 6/2017 | Myerberg et al. | |
| 2017/0173878 A1 | 6/2017 | Myerberg et al. | |
| 2017/0173879 A1 | 6/2017 | Myerberg et al. | |
| 2017/0182560 A1 | 6/2017 | Myerberg et al. | |
| 2017/0203357 A1* | 7/2017 | Pascall | B22F 12/00 |
| 2017/0252851 A1 | 9/2017 | Fulop et al. | |
| 2018/0194068 A1 | 7/2018 | Burke et al. | |
| 2018/0297272 A1* | 10/2018 | Preston | B33Y 50/02 |
| 2018/0304369 A1 | 10/2018 | Myerberg et al. | |
| 2018/0304370 A1 | 10/2018 | Myerberg et al. | |
| 2018/0311738 A1 | 11/2018 | Myerberg et al. | |
| 2018/0318933 A1 | 11/2018 | Myerberg et al. | |
| 2019/0202116 A1* | 7/2019 | Hsu | B33Y 40/00 |
| 2021/0053275 A1* | 2/2021 | Burke | B29C 64/209 |

FOREIGN PATENT DOCUMENTS

| | | |
|---|---|---|
| GB | 2549653 A | 10/2017 |
| GB | 2549653 B | 1/2019 |
| WO | 2011010213 A2 | 1/2011 |
| WO | 2016094660 A1 | 6/2016 |
| WO | 2017106787 A2 | 6/2017 |
| WO | 2019182989 A1 | 9/2019 |

OTHER PUBLICATIONS

International Search Report and Written Opinion issued in PCT/CA2018/050859, dated Sep. 20, 2018.

* cited by examiner

ADDITIVE MANUFACTURING SYSTEM AND METHOD

CROSS-REFERENCE TO RELATED APPLICATIONS

This application is a national stage application filed under 35 U.S.C. § 371 of PCT/CA2018/050859 filed Jul. 13, 2018, which claims the benefit of U.S. Provisional Application No. 62/532,428 filed on Jul. 14, 2017, the contents of which are incorporated herein by reference.

TECHNICAL FIELD

The technical field generally relates to additive manufacturing systems and methods, and more specifically to additive manufacturing systems and methods using a metal or a metal alloy as a deposition material.

BACKGROUND

Additive manufacturing, also known as "3D printing", can be performed using one of various methods. One of these methods, fused deposition modeling or FDM, uses a type of plastic as a deposition material.

Typically, FDM is performed with an FDM printer which melts the plastic and oozes it in successive layers to thereby create an object. Since plastics have generally poor thermal conductivity, the plastic deposited is able to at least partially melt the top surface of the previously deposited layer sufficiently to allow the deposited plastic to adhere to the top surface. This allows the plastic dispensed to form a new layer which adheres to the layer immediately below.

Unfortunately, the same method is difficult or even impossible to apply to metals. Metals have a relatively high thermal conductivity, which would cause the heat from the deposited metal to be dispersed throughout the workpiece and would not allow the top surface layer to melt.

Furthermore, only some types of metals could be melted in a state which would be suitable for deposition. Pure metals or eutectic alloys, for example, sharply transition from a solid state to a liquid state when their temperature is raised above their melting point, making them unsuitable for FDM.

On at least some metals, an oxide layer is also formed around the metal when the metal is exposed to oxygen. This layer would prevent the deposited material from adhering to the top surface layer. Unfortunately, current FDM methods and systems do not provide any means to prevent this oxide layer from forming or for breaking the oxide layer during the deposition process.

There is therefore a need for a system and/or a method which overcomes at least one of the above-identified drawbacks.

SUMMARY

According to one aspect, there is provided an additive manufacturing system comprising: a nozzle having a nozzle sidewall defining a central channel for allowing a deposition material filament to be dispensed therethrough on a workpiece; a heat source operatively coupled to the nozzle for melting the deposition material filament dispensed through the nozzle to form an additive material layer on a top surface of the workpiece with an oxide layer thereby forming around the melted deposition material; and an ultrasonic wave generator for providing ultrasonic waves into the melted deposition material in order to break up the oxide layer around the melted deposition material and bond the additive material layer to the workpiece.

In one embodiment, the deposition material filament is made of one of a metal and a metal alloy.

In one embodiment, the ultrasonic wave generator includes an ultrasonic transducer operatively coupled to the nozzle for providing ultrasonic waves into the melted deposition material through the nozzle.

In one embodiment, the ultrasonic wave generator further comprises an ultrasonic horn having a first end operatively connected to the ultrasonic transducer and a second end operatively connected to the nozzle.

In one embodiment, the ultrasonic horn includes a first cylindrical portion contacting the nozzle and a second cylindrical portion contacting the ultrasonic transducer, the first cylindrical portion having a first diameter and the second cylindrical portion having a second diameter greater than the first diameter.

In one embodiment, the ultrasonic wave generator includes an ultrasonic head distinct from the ultrasonic wave generator, the ultrasonic head being operatively coupled to the ultrasonic transducer to allow the ultrasonic transducer to provide ultrasonic waves into the melted deposition material through the ultrasonic head.

In one embodiment, the nozzle is made of titanium.

In one embodiment, the nozzle includes a body portion and an end portion from which the deposition material is dispensed.

In one embodiment, the body portion is cylindrical and the end portion is tapered.

In one embodiment, the nozzle includes at least one groove extending inwardly into the nozzle from an outer surface of the nozzle.

In one embodiment, the at least one groove includes a plurality of spaced-apart annular grooves disposed concentrically about a longitudinal axis of the nozzle.

In one embodiment, the at least one groove includes a plurality of spaced-apart longitudinal grooves extending generally parallel to a longitudinal axis of the nozzle.

In one embodiment, the system further comprises a susceptor sleeve coupled to the heat source, the susceptor sleeve being disposed around the nozzle and in contact with the nozzle to transfer heat by conduction to the deposition material filament within the central channel through the nozzle sidewall.

In one embodiment, the nozzle includes an inlet end adapted to receive the deposition material filament and an outlet end for dispensing the melted deposition material.

In one embodiment, the susceptor sleeve includes a first end disposed towards the outlet end of the nozzle and a second end disposed towards the inlet end of the nozzle.

In one embodiment, the outlet end of the nozzle is tapered.

In one embodiment, the susceptor sleeve includes a reduced inner diameter portion located at the first end, the reduced inner diameter portion being sized and shaped to prevent the nozzle from exiting the sleeve through the first end.

In one embodiment, the susceptor sleeve further includes an end clamp member removably connected to the second end of the susceptor sleeve to prevent the nozzle from moving outwardly from the susceptor sleeve through the second end of the susceptor sleeve.

In one embodiment, the susceptor sleeve includes an end portion located towards the first end, a body portion located towards the second end and an intermediate portion extending between the end portion and the body portion.

In one embodiment, the intermediate portion includes at least one groove extending inwardly into the susceptor sleeve from an outer surface of the susceptor sleeve.

In one embodiment, the at least one groove includes a plurality of spaced-apart annular grooves disposed concentrically about a longitudinal axis of the susceptor sleeve.

In one embodiment, the at least one groove includes a plurality of spaced-apart longitudinal grooves extending generally parallel to a longitudinal axis of the susceptor sleeve.

In one embodiment, the susceptor sleeve is made of stainless steel.

In one embodiment, the heat source includes a magnetic flux concentrator.

In one embodiment, the magnetic flux concentrator includes: a penannular core member having first and second ends spaced apart to define a gap therebetween, the core member being disposed such that the nozzle is received within the gap; and a coil disposed around the core member, the coil being operatively connected to an electric power source.

In one embodiment, the heat source includes an induction coil disposed concentrically around the nozzle, the induction coil being operatively connected to an electric power source.

In one embodiment, the system further includes a platform for supporting the workpiece and a platform actuator operatively connected to the platform for selectively moving the platform vertically towards and away from the nozzle.

In one embodiment, the system further comprises a workpiece heater to heat the workpiece.

In one embodiment, the workpiece heater includes an electrical current source operatively connected to the platform and to the nozzle to form a closed electrical circuit through the platform, the workpiece, the nozzle and the electrical current source in order to resistively heat at least one of the top surface of the workpiece, the nozzle and the melted deposition material between the top surface of the workpiece and the nozzle.

In one embodiment, the workpiece heater includes an insulated heated chamber having a thermally-insulated sidewall extending generally vertically around the platform and a thermally-insulated roof panel extending generally horizontally above the thermally-insulated sidewall, the roof panel including a nozzle opening adapted to allow the nozzle to access the interior of the insulated heated chamber.

In one embodiment, the roof panel is movable relative to the platform to allow the nozzle to be moved horizontally relative to the platform.

In one embodiment, the system further includes a filament feeder for feeding the deposition material filament to the nozzle.

In one embodiment, the system further includes a nozzle displacement mechanism operatively connected to the nozzle for moving the nozzle horizontally relative to the platform.

In one embodiment, the system further includes a controller operatively connected to the platform actuator, to the filament feeder and to the nozzle displacement mechanism, the controller being configured for feeding the deposition material filament at a feed speed using the filament feeder, for simultaneously moving the platform downwardly in accordance with the feed speed and for simultaneously displacing the nozzle horizontally relative to the platform according to a desired pattern to provide a desired shape to the workpiece.

According to yet another aspect, there is also provided an additive manufacturing method comprising: dispensing a deposition material filament through a central channel of a nozzle; heating the deposition material filament inside the nozzle to melt the dispensed deposition material filament; dispensing the melted deposition material on a top surface of a workpiece to form an additive material layer on the workpiece with an oxide layer forming around the melted deposition material; providing ultrasonic waves into the melted deposition material to break up the oxide layer around the melted deposition material and bond the additive material layer to the workpiece.

In one embodiment, the method further comprises heating at least one of the top surface of the workpiece, the nozzle and the melted deposition material between the top surface of the workpiece and the nozzle at a desired temperature to delay the hardening of the melted deposition material.

In one embodiment, heating the deposition material filament includes heating a susceptor sleeve disposed around the nozzle and in contact with the nozzle to transfer heat by conduction to the deposition material filament within the central channel through a nozzle sidewall of the nozzle.

In one embodiment, dispensing the melted deposition material on the top surface of the workpiece includes moving the nozzle horizontally relative to the workpiece.

In one embodiment, the method further comprises, after providing ultrasonic waves into the melted deposition material, moving the workpiece vertically away from the nozzle.

Further details of the invention and its advantages will be apparent from the detailed description included below.

DETAILED DESCRIPTION

In the following description of the embodiments, references to the accompanying drawings are by way of illustration of an example by which the invention may be practiced. It will be understood that other embodiments may be made without departing from the scope of the invention disclosed.

Figure 1:
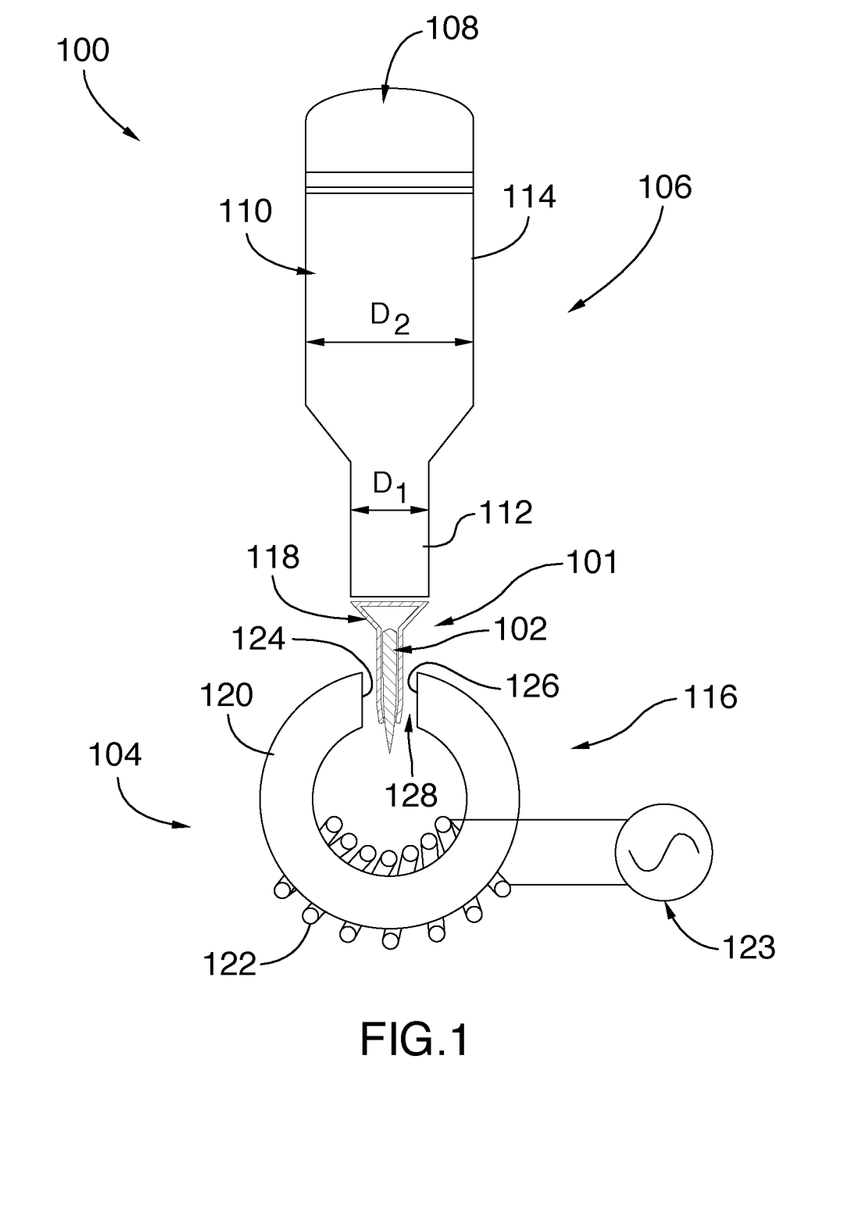
FIG. 1 is a schematic drawing showing an additive manufacturing system, in accordance with one embodiment.
Figures 2A, 2B:
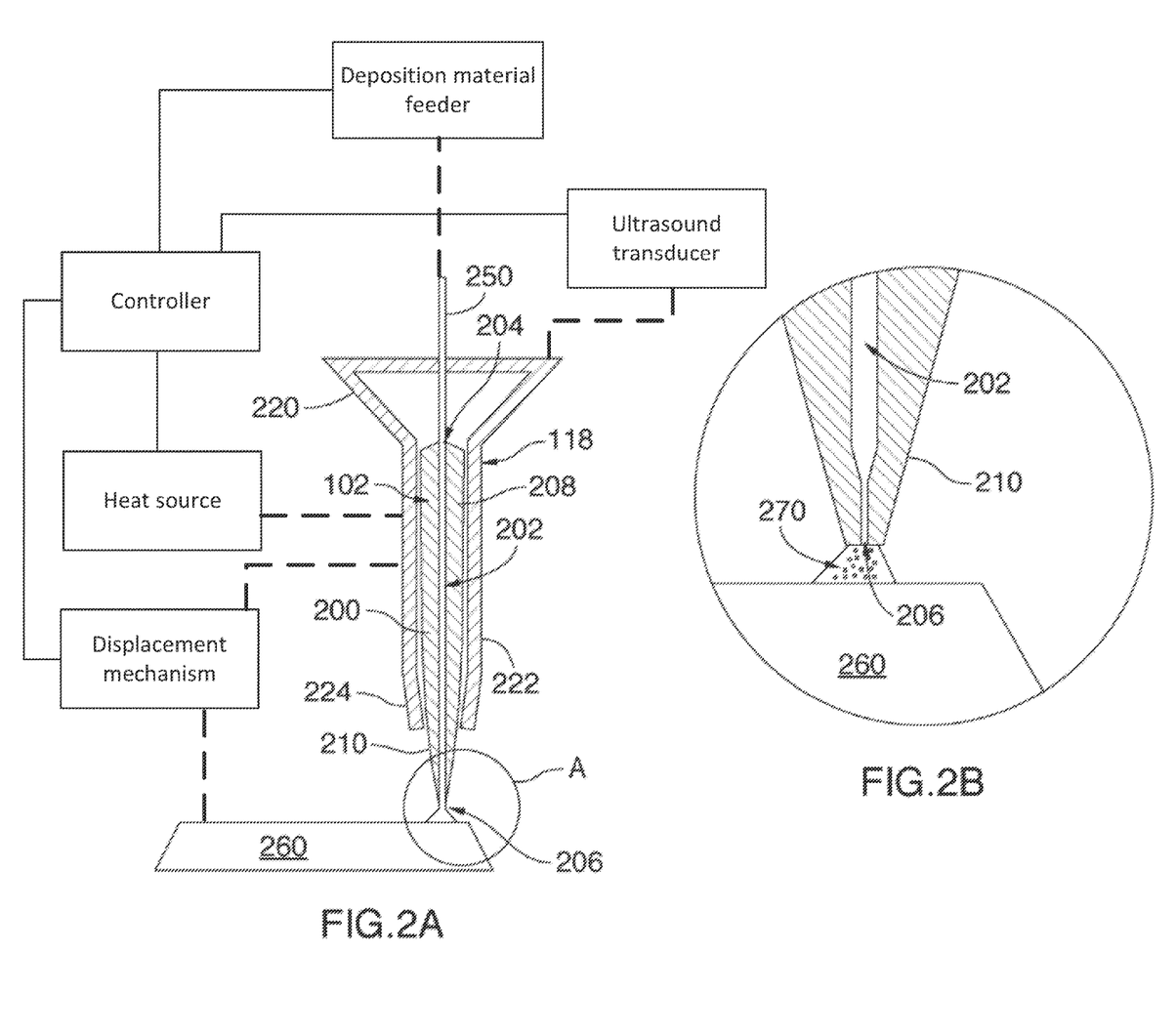
FIG. 2A is a schematic drawing showing a cross-section of a nozzle and a susceptor sleeve disposed around the nozzle for the system illustrated in FIG. 1.
FIG. 2B is an enlarged view, taken from area A of FIG. 2A, showing the nozzle illustrated in FIG. 2A, with the nozzle dispensing melted deposition material on a workpiece.

Referring first to FIGS. 1-2B, there is provided an additive manufacturing system 100, in accordance with one embodiment.

The system 100 includes a nozzle assembly 101 configured for dispensing a deposition material and a heat source 104 operatively coupled to the nozzle assembly 101.

The deposition material is initially provided into the nozzle assembly 101 in a solid state. Specifically, the deposition material is provided as a deposition material filament 250 which is fed into the nozzle assembly 101 using a deposition material feeder, e.g., a filament feeder as shown in FIG. 2A.

As best shown in FIG. 2A, the nozzle assembly 101 includes a nozzle 102 having a nozzle sidewall 200 and a central channel 202 defined by the nozzle sidewall 200. The central channel 202 is sized and shaped to allow the deposition material filament 250 to pass through. In the embodiment illustrated in FIGS. 1-2B, the central channel 202 includes an inlet 204 in which the deposition material filament 250 is fed and an outlet 206 through which deposition material is dispensed from the nozzle 102.

In the illustrated embodiment, the nozzle 102 includes a cylindrical portion 208 and a tapered end portion or tip 210 located at the outlet 206 of the central channel 202. Alternatively, the nozzle 102 could have any other configuration deemed suitable by a skilled person.

Still referring to FIGS. 1-2B, the heat source 104 is adapted to heat the deposition material sufficiently as it passes through the nozzle 102 to allow the deposition material to melt as it is dispensed. Specifically, the heat source 104 is adapted to heat the deposition material filament 250 as it passes through the nozzle 102 to transform the deposition material from a solid state to an at least partially liquid state.

In one embodiment, the melted deposition material is deposited in successive layers which bond with previously formed layers to create a tridimensional object. More specifically, the melted deposition material is dispensed over a workpiece 260 which is formed by the previously deposited layers. As the deposition material is dispensed from the nozzle 102, the workpiece 260 moves relative to the nozzle 102 so as to form a new deposited additive material layer which bonds to a top surface of the workpiece 260.

In one embodiment, the workpiece 260 is temporarily secured on a platform, not shown, operatively connected to a platform actuator which allows the workpiece 260 to be moved relative to the nozzle horizontally along a horizontal axis or a horizontal plane, and/or vertically away from the nozzle 102 as additional layers are deposited on the workpiece 260.

Alternatively, instead of the workpiece 260 being movable relative to the nozzle 102, the nozzle 102 could instead be operatively connected to a nozzle displacement mechanism (see FIG. 2A), and be movable relative to the workpiece 260. In yet another embodiment, both the nozzle 102 and the workpiece 260 could be movable relative to each other.

Furthermore, in the illustrated embodiment, the workpiece 260 is disposed below the nozzle 102 and the nozzle 102 is adapted to be oriented generally vertically such that the central channel 202 of the nozzle 102 is generally vertical, in order to dispense melted deposition material relatively vertically and downwardly on the workpiece 260. Alternatively, the nozzle 102 could be mounted on a multiaxis assembly which would further allow the nozzle 102 to be rotated such that the central channel 202 is angled relative to the vertical.

In one embodiment, the deposition material includes a metal or a metal alloy. For example, the deposition material could include aluminium, bronze, brass or an alloy thereof. Alternatively, the deposition material could include any other deposition material suitable to be used with the system 100. For example, the deposition material could include a plastic such as polyether ether ketone or PEEK, polyetherimide or PEI, or the like. In another example, the deposition material could include a metal matrix composite (MMC), which may include a mix of a metal and a non-metallic material such as a ceramic or the like.

The system 100 further includes an ultrasonic wave generator 106 which is adapted for providing ultrasonic waves into the melted deposition material.

Specifically, when the melted deposition material is dispensed from the nozzle 102, it forms a melt pool 270 below the nozzle 102. The ultrasonic wave generator 106 is adapted for providing ultrasonic waves into the melted deposition material in the melt pool 270. In an embodiment in which the deposition material includes a metal or a metal alloy, it will be appreciated that when the melted deposition material is exposed to ambient air, an oxide layer will form around the deposited material. It will therefore also be appreciated that the ultrasonic waves generated by the ultrasonic wave generator 106 will cause cavitation within the melt pool 270, which will break up the oxide layer around the deposited material and allow bonds to be formed between the top surface of the workpiece and the melted deposition material in the melt pool to thereby bond the additive material layer to the workpiece.

Furthermore, it will be appreciated that when the deposited melted material is dispensed on the top surface of the workpiece, its temperature starts to decrease over time, which causes the melted material to solidify until the additive material layer is eventually entirely solidified.

It will further be appreciated that if the deposition material includes a metal alloy, the deposition material may not solidify uniformly and may instead pass through a transitive state (or "slush") in which the deposition material simultaneously contains a solid phase made of one of the components of the alloy and a liquid phase made of another component of the alloy. In this case, the ultrasonic waves may serve to stir melted deposition material such that the solid and liquid phase are mixed together substantially homogeneously. In addition, the ultrasonic waves may further contribute to wetting within the melted deposition material between the solid phase and the liquid phase, thereby further improving the strength of the solidified additive material layer.

It will also be appreciated that as the melted deposition material solidifies, dendrites may form in the melted deposition material. Dendrites are solid structures which grow within the melted deposition material and which affect various material properties of the deposition material. The uncontrolled formation of dendrites in the melted deposition material as it solidifies may therefore provide the additive material layer with potentially undesirable material properties. With the system 100 described above, the ultrasonic waves generated by the ultrasonic wave generator 106 may break up the dendrites as they form in the melted deposition material to thereby allow the melted deposition material to solidify relatively homogeneously and thereby create a generally homogeneous material structure within the additive material layer.

In an embodiment in which the deposition material includes a metal matrix composite (MMC) made of a metal and a non-metallic material such as a ceramic powder, the heat source may melt the metal and the ultrasonic waves may further homogenize, wet and bond the melted metal with the ceramic powder. This creates a robust structure in which the metal and the ceramic are bonded together relatively homogeneously.

Alternatively, if the deposition material includes a plastic or a similar material, the ultrasonic waves may promote adherence between the melted deposition material and the top layer of the workpiece 260 on which the melted deposition material is dispensed.

In the embodiment illustrated in FIG. 1, the ultrasonic wave generator 106 is operatively coupled to the nozzle 102. Specifically, the ultrasonic wave generator 106 includes an ultrasonic transducer 108 for producing ultrasonic vibrations and an ultrasonic horn 110 operatively connecting the ultrasonic transducer 108 to the nozzle 102 to transmit ultrasonic vibrations to the nozzle 102.

In one embodiment, the ultrasonic transducer 108 includes a 100 W electronic transducer adapted to generate ultrasonic waves at a frequency of 28 kHz. Alternatively, the ultrasonic transducer 108 could include another type of transducer and/or could be adapted to generate ultrasonic waves at any other power or frequency which a skilled person would consider appropriate.

In the embodiment illustrated in FIG. 1, the ultrasonic horn 110 is generally bottle-shaped and includes a first cylindrical portion 112 contacting the nozzle 102 and a second cylindrical portion 114 contacting the ultrasonic transducer 108. As shown in FIG. 1, the first cylindrical portion 112 has a first diameter $D_1$ and the second cylindrical portion 114 has a second diameter $D_2$ which is larger than the first diameter $D_1$. This configuration allows the ultrasonic horn 110 to amplify the ultrasonic vibrations generated by the ultrasonic transducer 108, as a skilled person will appreciate.

In the embodiment illustrated in FIG. 1, the heat source 104 includes a magnetic flux concentrator 116 which allows the deposition material filament 250 to be heated locally within the nozzle 102, which results in a relatively efficient heating of the filament.

Still in the embodiment illustrated in FIG. 1, the nozzle assembly 101 further comprises a susceptor sleeve 118 disposed around the nozzle 102 and coupled to the magnetic flux concentrator 116. A skilled person will appreciate that a susceptor sleeve 118 is adapted to absorb electromagnetic energy and to convert it into heat. More specifically, the susceptor sleeve 118 is in contact with the nozzle 102 to transfer heat by conduction to the deposition material filament 250 within the central channel 202 through the nozzle sidewall 200.

As best shown in FIG. 2A, the susceptor sleeve 118 includes a funneled-shaped top portion 220, an intermediate cylindrical portion 222 and a tapered lower portion 224 which has a reduced diameter compared to the intermediate cylindrical portion 222. Specifically, the intermediate cylindrical portion 222 is sized and shaped to receive the cylindrical portion 208 of the nozzle 102 and the tapered lower portion 224 is sized and shaped to receive the tapered end portion 210 of the nozzle 102.

Referring now specifically to FIG. 1, the magnetic flux concentrator 116 is adapted to specifically heat the susceptor sleeve 118, which in turn heats and melts the deposition material filament 250 by conduction through the nozzle 102.

Specifically, the magnetic flux concentrator 116 includes a core member 120 and a coil 122 disposed around the core member 120. The coil 122 is made of a conductive wire and is operatively connected to a power source 123 which provides electric current to the coil 122.

It will be appreciated that the core member 120 and the coil 122 thereby together form an electromagnet. Specifically, the core member 120 is penannular and has first and second ends 124, 126 which are spaced apart to define a gap 128. The core member 120 is disposed such that the nozzle 102 is received within the gap 128. In this configuration, the magnetic field emitted by the magnetic flux concentrator 116 is concentrated towards the susceptor sleeve 118 and/or the nozzle 102. It will be appreciated that the magnetic field will thereby create eddy currents in the susceptor sleeve 118 which will cause the susceptor sleeve 118 to be heated through resistive heating within the susceptor sleeve 118, in accordance with a process known as "induction heating".

Still in the embodiment illustrated in FIG. 1, the nozzle 102 is made of a ceramic. It will be appreciated that in this embodiment, the deposition material will not dissolve or corrode the nozzle as it would if the nozzle was made of a metal.

In an alternative embodiment, the nozzle 102 may be made of titanium. More specifically, the nozzle 102 may be made of titanium with a titanium diboride coating, which may be obtained by treating a titanium nozzle with a boronizing process.

In another embodiment, the nozzle 102 may instead be made of sapphire or another crystal having a relatively high thermal conductivity at high temperatures. Alternatively, the nozzle 102 may be manufactured using any other material deemed suitable by a skilled person.

In this embodiment, since the susceptor sleeve 118 transfers heat to the deposition material filament by conduction through the nozzle 102, it may therefore be desirable to manufacture the nozzle 102 from a material having a relatively high thermal conductivity. For example, the nozzle 102 could be manufactured from a material having a thermal conductivity which is higher than 5 W/mK, such as fully dense aluminium oxide or the like.

Alternatively, the nozzle assembly 101 may not include the susceptor sleeve 118. Instead, the nozzle 102 may be made of a metal, such as titanium as described above, and may be directly heated by the magnetic flux concentrator 116. In this embodiment, the nozzle 102 could include an externally-threaded surface and be simply screwed into the ultrasonic horn 110 above or into a frame in which the ultrasonic horn 110 is received.

In one embodiment, the system 100, as shown in FIG. 2A, further includes a controller such as a personal computer, a dedicated computer, a programmable logic controller (PLC) or the like which is operatively connected to the platform actuator, to the filament feeder and to the nozzle displacement mechanism. The controller is configured for feeding the deposition material filament at a feed speed using the filament feeder, for simultaneously moving the platform downwardly in accordance with the feed speed and for simultaneously displacing the nozzle horizontally relative to the platform according to a desired pattern to provide a desired three-dimensional shape to the workpiece. For example, a user may input a representation of the desired three-dimensional shape as a computer-assisted design (CAD) file into the controller. The controller then provides the necessary commands to the platform actuator, to the filament feeder and to the nozzle displacement mechanism to create the desired three-dimensional shape using the deposition material filament.

Figure 3:
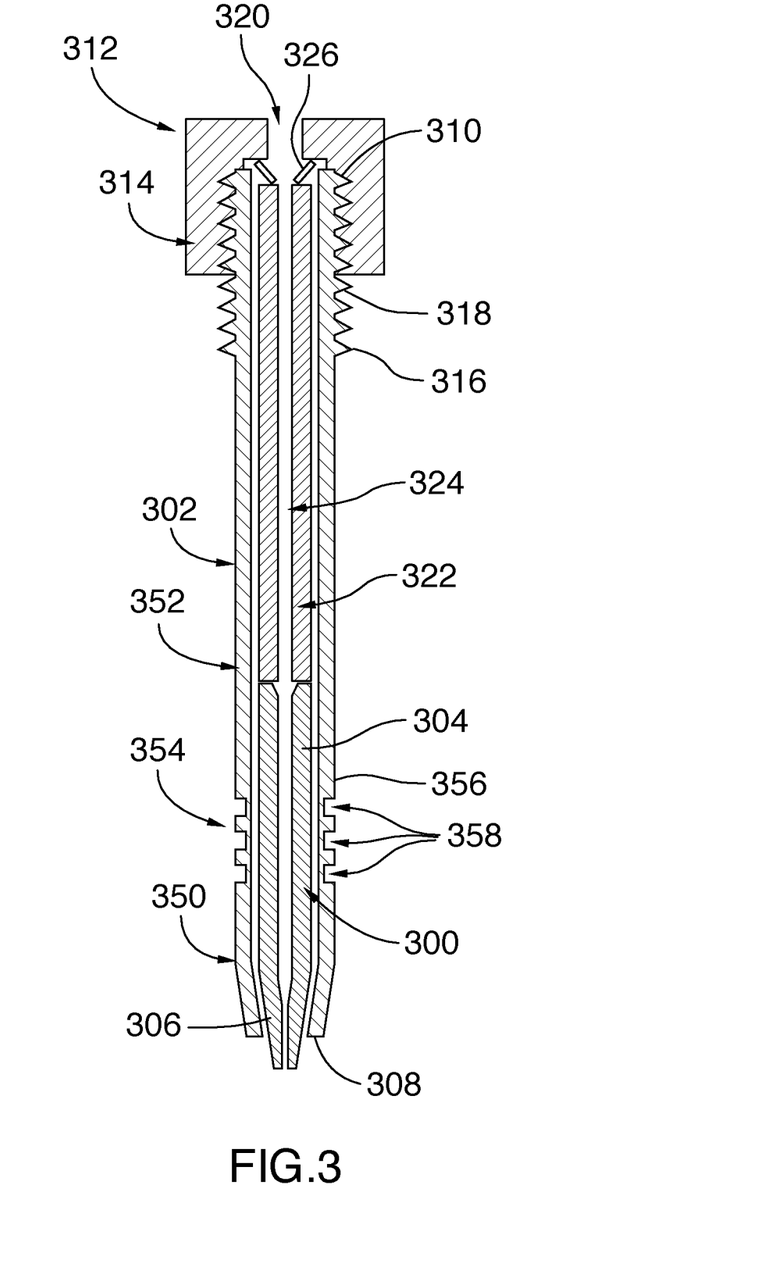
FIG. 3 is a schematic drawing showing a cross-section of a nozzle and a susceptor sleeve for an additive manufacturing system, in accordance with another embodiment.

Referring now to FIG. 3, there is shown a nozzle 300 and a susceptor sleeve 302, in accordance with another embodiment.

In this embodiment, the nozzle 300 is generally similar to the nozzle 102 illustrated in FIGS. 1-2A. Specifically, the nozzle 300 includes a cylindrical body portion 304 and a tapered end portion or tip 306 from which the deposition material is dispensed.

Still in the embodiment illustrated in FIG. 3, the susceptor sleeve 302 is generally cylindrical and includes a lower end 308 and an upper end 310. The lower end 308 is tapered and is sized and shaped to receive the tapered end portion 306 of the nozzle 300.

The susceptor sleeve 302 further includes an end clamp member 312 adapted to be removably connected to the upper end 310 of the susceptor sleeve 302. In the embodiment illustrated in FIG. 3, the end clamp member 310 includes a lid member 314 adapted to be fastened to the upper end 310 of the susceptor sleeve 302. Specifically, the upper end 310 includes an external threaded surface 316 which extends towards the lower end 308 of the susceptor sleeve 302 and which is adapted to engage a corresponding internally-threaded bore 318 of the lid member 314. The lid member 314 further includes a central opening 320 sized and shaped to allow the deposition material filament to pass through.

In the embodiment illustrated in FIG. 3, the lid member 314 is provided as a distinct piece. Alternatively, the lid member 314 could instead form part of the first cylindrical portion 112 of the ultrasonic horn 114 of the system 100 illustrated in FIGS. 1-2B.

Still in the embodiment illustrated in FIG. 3, the susceptor sleeve 302 is substantially longer than the nozzle 300 and include an elongated internal spacer member 322 disposed between the nozzle 300 and the lid member 314. The internal spacer member 322 includes a central passageway 324 which allows the deposition material filament inserted through the central opening 320 of the lid member 314 to pass through the internal spacer member 322 and reach the nozzle 300.

The lid member 314 further include a resilient member 326, such as a compression spring, disposed within the internally-threaded bore 318. The resilient member 326 biases the internal spacer member 322 towards the nozzle 300. The internal spacer member abuts the nozzle 300 and in turn biases the nozzle 300 away from the lid member 314. The tapered end portion 306 of the nozzle 300 abuts the tapered lower end 308 of the susceptor sleeve 302, which both prevents the nozzle 300 from exiting the susceptor sleeve 302 and the nozzle 300 from moving axially within the susceptor sleeve 302.

Still referring to FIG. 3, the susceptor sleeve 302 is further configured to concentrate magnetic current flow towards the lower end 308 of the susceptor sleeve 302. In this configuration, the magnetic flux concentrator 116 acts locally on the susceptor sleeve 302 to only induce resistive heating in a desired portion of the susceptor sleeve 302, thereby reducing the time and energy required to unnecessarily heat the rest of the susceptor sleeve 302.

Specifically, the susceptor sleeve 302 includes an end portion 350 located towards its lower end 308 and adapted to be heated using the magnetic flux concentrator 116, a body portion 352 located towards its upper end 310 and an intermediate portion 354 extending between the end portion 350 and the body portion 352. As shown in FIG. 3, the susceptor sleeve 302 includes an outer surface 356 and the intermediate portion 354 includes a plurality of spaced-apart annular grooves 358 which extend from the outer surface 356 into the susceptor sleeve 302 and which are disposed coaxially around the longitudinal axis of the susceptor sleeve 302.

In operation, the magnetic flux concentrator 116 is disposed generally adjacent the end portion 350 of the susceptor sleeve 302 so as to generate eddy currents specifically in the end portion 350 and thereby resistively heating the end portion 350, which in turns specifically heats the end portion 306 of the nozzle 300.

It will be appreciated that eddy currents formed within a metallic body are generally mainly distributed near an outer surface of the metallic body. In the present embodiment, the eddy currents formed within the susceptor sleeve 302 are generally distributed near the outer surface 356 of the susceptor sleeve 302. The eddy currents are therefore generally prevented from travelling from the end portion 350 to the body portion 352 by the annular grooves 358 defined in the intermediate portion 354, thereby effectively constraining the eddy currents formed in the end portion 350 to the end portion 350.

Alternatively, the susceptor sleeve 302 may not comprise the annular grooves 258 and the outer surface 356 of the susceptor sleeve 302 may instead be substantially smooth and continuous.

As explained above, in one embodiment, the additive manufacturing system 100 may not include a susceptor sleeve. Instead, the nozzle 300 may be made of metal and may be heated directly by the magnetic flux concentrator 116. In this embodiment, the annular grooves would be defined directly on the nozzle and would be disposed coaxially around the longitudinal axis of the nozzle. The annular grooves could further be defined on the body portion 304 of the nozzle 300 adjacent the end portion 306 such that the eddy currents generated by the magnetic flux concentrator 116 may be generally confined to the end portion 306.

Figure 4A:
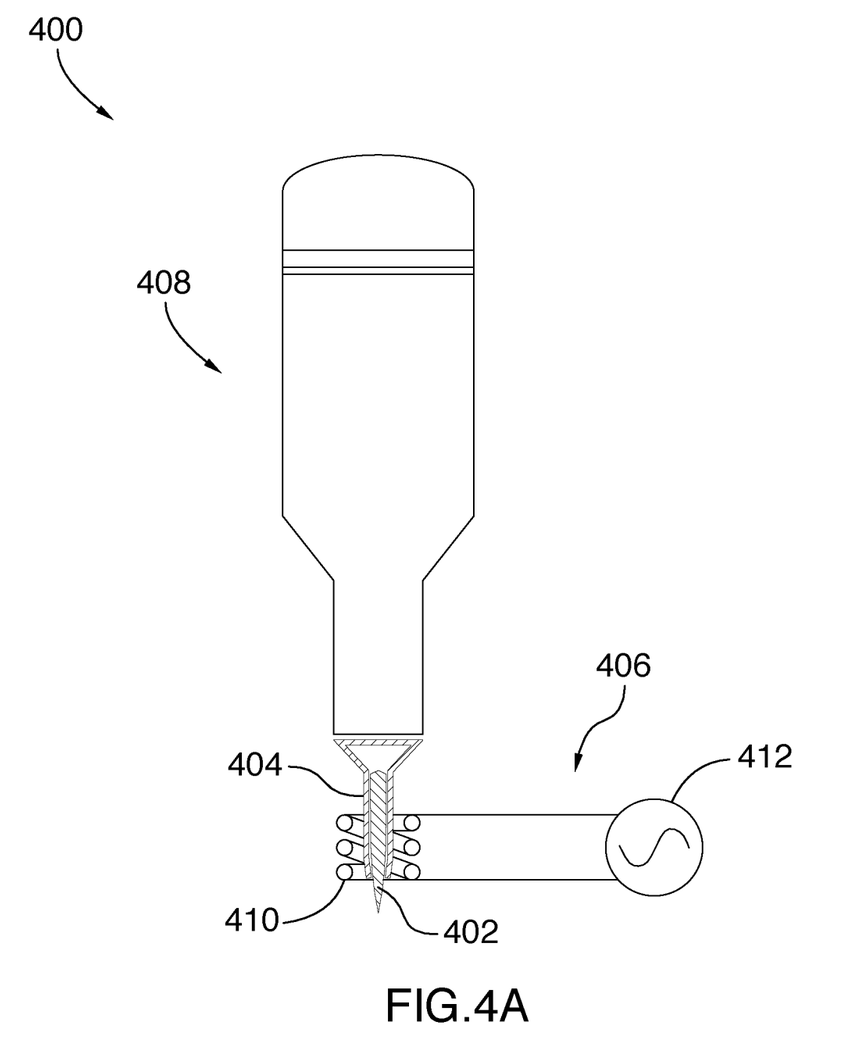
FIG. 4A is a schematic drawing showing an additive manufacturing system, in accordance with another embodiment.

Now turning to FIG. 4A, there is provided an additive manufacturing system 400, in accordance with an alternative embodiment.

The system 400 is generally similar to the system 100 illustrated in FIGS. 1-2B. Specifically, the system 400 includes a nozzle 402, a susceptor sleeve 404 disposed around the nozzle 402, a heat source 406 and an ultrasonic wave generator 408.

In the embodiment illustrated in FIG. 4A, the heat source 400 includes an induction coil 410 instead of a magnetic flux concentrator. The induction coil 410 is disposed concentrically around the nozzle 402 and is operatively connected to an electric power source 412 to provide electromagnetic energy to the susceptor sleeve 404, which is converted to heat by the susceptor sleeve 404.

In an alternative embodiment, the systems 100 or 400 may not include a susceptor sleeve. Instead, the heat source may be configured to directly heat the deposition material filament within the nozzle.

In this embodiment, it may be desirable to manufacture the nozzle from a material having a relatively low thermal conductivity, such as zirconium dioxide or the like, to prevent heat loss from the deposition material inside the nozzle to the environment around the nozzle by conduction through the nozzle.

It will be appreciated that this embodiment may allow the deposition material filament to be heated to a relatively higher temperature than when using a susceptor sleeve, which allows the system to be used with deposition materials with a relatively high melting point such as steel, titanium or the like.

Figure 4B:
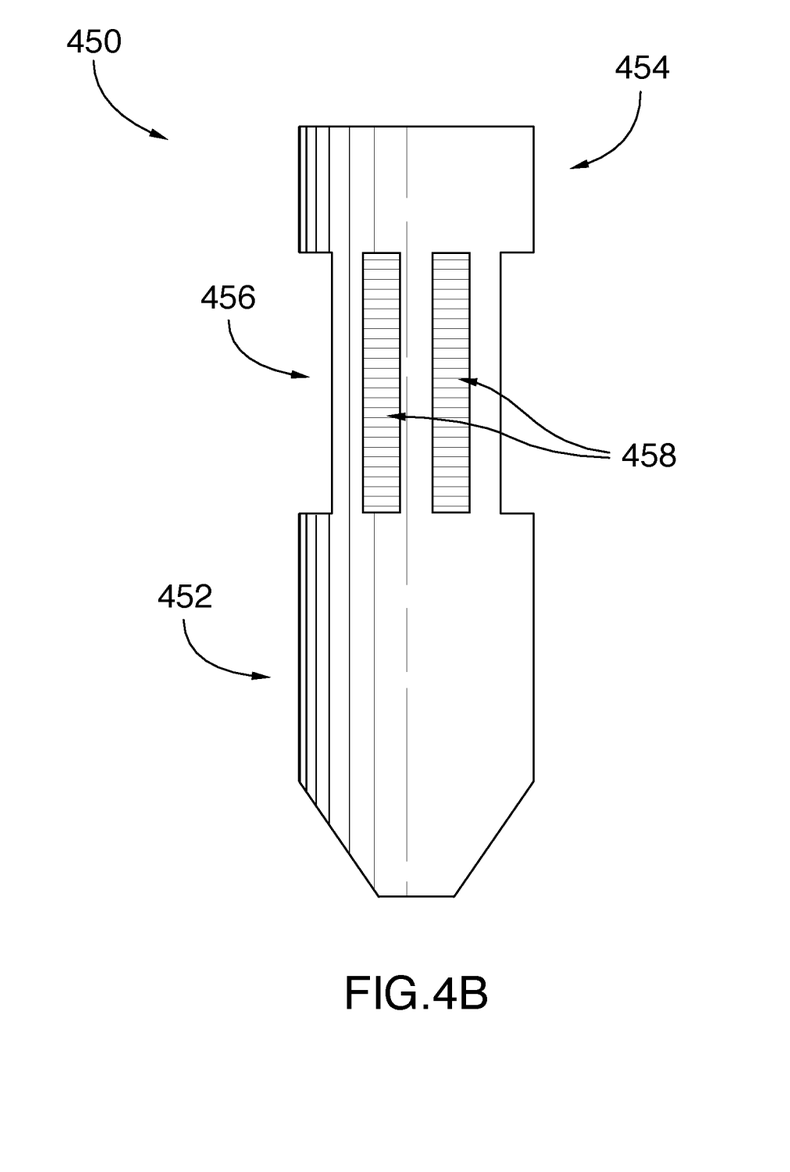
FIG. 4B is a schematic drawing showing a susceptor sleeve for the additive manufacturing system illustrated in FIG. 1.

FIG. 4B shows another embodiment of a susceptor sleeve 450 adapted to be used with the additive manufacturing system 400 illustrated in FIG. 4A and described above. Similarly to the susceptor sleeve 302 described above, the susceptor sleeve 450 includes an end portion 452, a body portion 454 and an intermediate portion 456 extending between the end portion 452 and the body portion 454.

In this embodiment, the end portion 452 of the susceptor sleeve 450 is adapted to be heated using the induction coil 410 instead of the magnetic flux concentrator 116. More specifically, instead of annular grooves, the intermediate portion 456 includes a plurality of spaced-apart longitudinal grooves 458 which extend generally parallel to a longitudinal axis of the susceptor sleeve 450.

It will be understood that the induction coil 410 disposed around the susceptor sleeve 450 creates eddy currents in the end portion 452 which are generally oriented coaxially to the longitudinal axis of the susceptor sleeve 450. Therefore, the longitudinal grooves 458 will prevent eddy currents from forming in the intermediate portion 456, thereby effectively constraining the eddy currents formed in the end portion 452 to the end portion 452.

As explained above, in one embodiment, the additive manufacturing system 400 may not include a susceptor sleeve 450 and may instead include a solid metal nozzle which is heated directly by the induction coil 410. In this embodiment, the longitudinal grooves could be defined directly on an outer sidewall of the nozzle.

Figure 5:
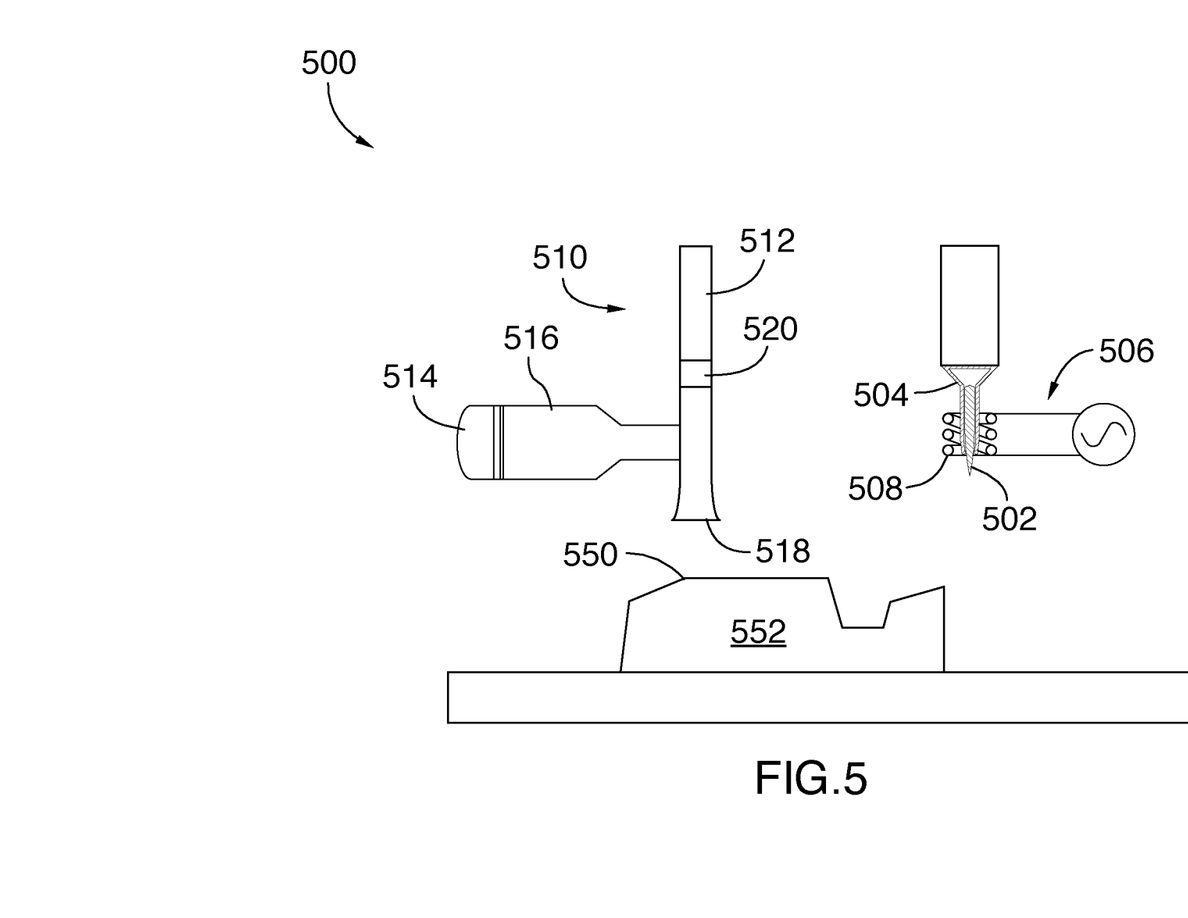
FIG. 5 is a schematic drawing showing an additive manufacturing system, in accordance with yet another embodiment, including an ultrasonic wave generator and an ultrasonic head distinct from the ultrasonic wave generator.

Turning to FIG. 5, there is provided an additive manufacturing system 500, in accordance with yet another embodiment.

In the embodiment illustrated in FIG. 5, the system 500 includes a nozzle 502, a susceptor sleeve 504 and a heat source 506 which are similar to the nozzle 402, susceptor sleeve 404 and heat source 406 illustrated in FIG. 4A. Specifically, the heat source 506 includes an induction coil 508 disposed concentrically around the nozzle 502 and the susceptor sleeve 504. Alternatively, the heat source 506 could instead include a magnetic flux concentrator similar to the magnetic flux concentrator 116 of the system 100 illustrated in FIGS. 1-2A.

In the embodiment illustrated in FIG. 5, the system 500 further includes an ultrasonic wave generator 510 which is distinct and spaced from the nozzle 502 and the susceptor sleeve 504. Specifically, the ultrasonic wave generator 510 includes an ultrasonic head 512 coupled to an ultrasonic transducer 514 via an ultrasonic horn 516. The ultrasonic transducer 514 and the ultrasonic horn 516 are generally similar to the ultrasonic transducer 108 and the ultrasonic horn 110 illustrated in FIGS. 1-4A. Still in the embodiment illustrated in FIG. 5, the ultrasonic head 512 is disposed generally vertically and the ultrasonic transducer 514 and the ultrasonic horn 516 are disposed generally horizontally against the ultrasonic head 512 to provide ultrasonic waves causing vibrations which are generally parallel to the top surface of the workpiece. It will be appreciated that this configuration may be particularly suitable for bonding together the additive material layer to the workpiece when the deposition material is a metal, for example.

Alternatively, the ultrasonic head 512, the ultrasonic transducer 514 and the ultrasonic horn 516 could be disposed according to another configuration. For example, the ultrasonic transducer 514 and the ultrasonic horn 516 could be disposed generally vertically as illustrated in FIGS. 1-2B, to provide ultrasonic waves causing vibrations which are generally perpendicular to the top surface of the workpiece. It will be appreciated that this configuration may be particularly suitable for bonding together the additive material layer to the workpiece when the deposition material is a plastic, for example.

The ultrasonic head 512 is generally cylindrical and elongated, and includes an enlarged bottom portion 518 adapted to contact the melted deposition material deposited on a top surface 550 of a workpiece 552.

Still in the embodiment illustrated in FIG. 5, the ultrasonic head 512 is adapted to move generally vertically towards and away from the workpiece 552 and further includes a pressure sensor 520 which is adapted to detect that the enlarged bottom portion 518 of the ultrasonic head 512 abuts the deposited material.

When the system 500 is in operation, the nozzle 502 dispenses melted deposition material on the workpiece 552, similarly to the nozzles 102, 300, 402 of the systems 100, 400 illustrated in FIGS. 1-4A. The workpiece 552 is then moved horizontally relative to the nozzle 502 such that the melted deposition material is aligned with the ultrasonic head 512. The ultrasonic head 512 is then lowered until the enlarged bottom portion 518 contacts and abuts the melted deposition material, thereby providing ultrasonic waves into the melted deposition material to promote bonding of the melted deposition material to the top surface 550 of the workpiece 552 to thereby form a new layer of deposition material on the workpiece 552.

Each layer formed could have a desired thickness. For example, the new layer of deposition material formed on the workpiece 552 could have a thickness of about 0.2 mm. Alternatively, the new layer of deposition material could have another thickness.

In one embodiment, the ultrasonic head 512 could be moved towards the workpiece 552 until the ultrasonic head 512 applies a desired amount of pressure on the melted deposition material, as detected by the pressure sensor 520.

In one embodiment, the ultrasonic head 512 could be generally similar to an ultrasonic welding head adapted to be used in an ultrasonic welding process. Alternatively, the ultrasonic head 512 could have any configuration which a skilled person would consider to be suitable.

Figure 6:
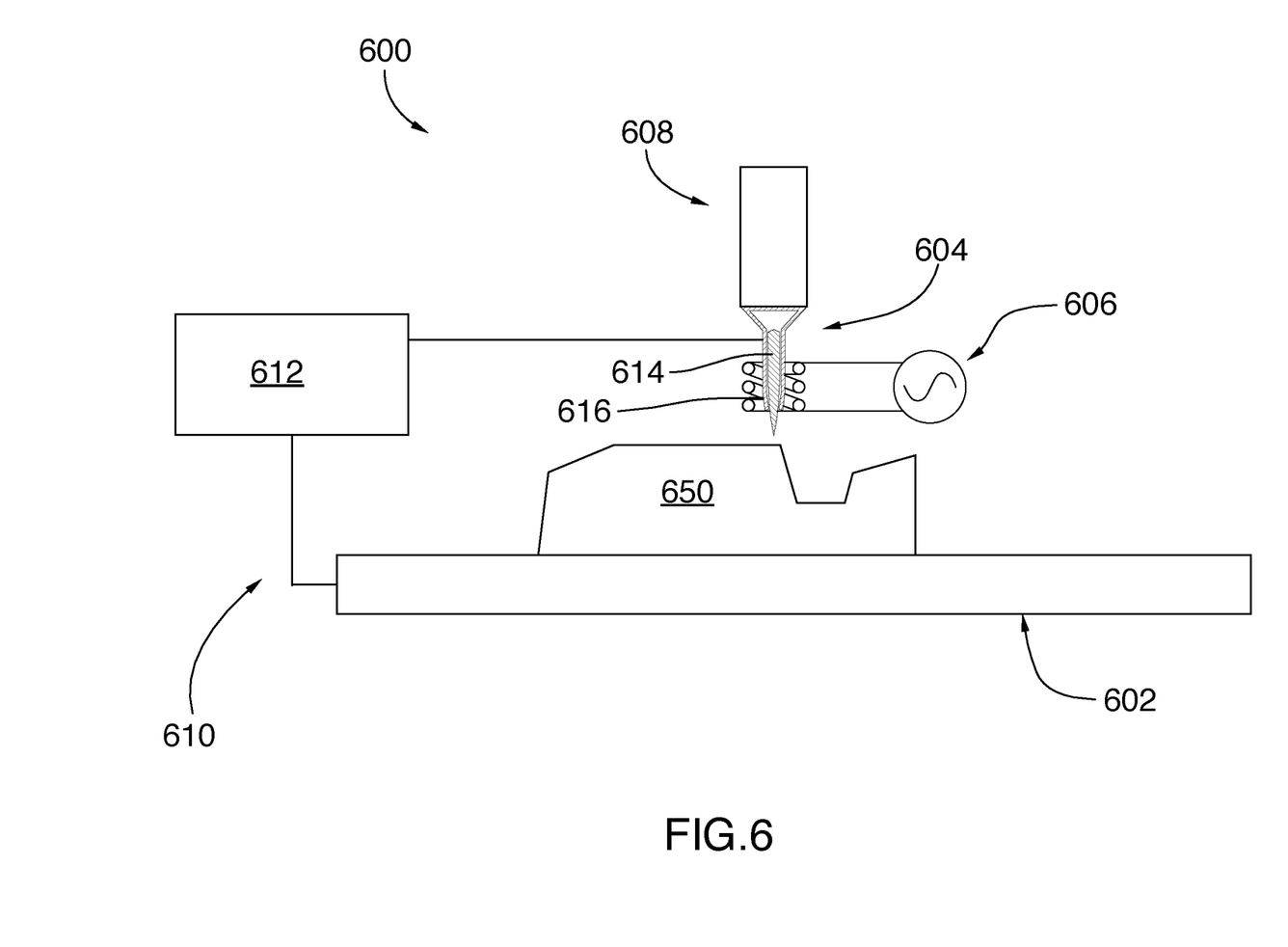
FIG. 6 is a schematic drawing showing an additive manufacturing system, in accordance with yet another embodiment, including an electrical current source for resistively heating the workpiece.

Now turning to FIG. 6, there is provided an additive manufacturing system 600, in accordance with yet another embodiment.

The additive manufacturing system 600 is generally similar to the additive manufacturing system 400 illustrated in FIG. 4 and includes a platform 602 for supporting the workpiece 650, a nozzle assembly 604 for dispensing a deposition material filament towards the workpiece 650, a heat source 606 operatively coupled to the nozzle assembly 604 for melting the deposition material filament onto the workpiece 650 and an ultrasonic wave generator 608 coupled to the nozzle 604 to generate ultrasonic waves and provide the ultrasonic waves into the melted deposition material.

In the embodiment illustrated in FIG. 6, the additive manufacturing system 600 further includes a workpiece heating mechanism 610 to heat at least one of the top surface of the workpiece 650, the nozzle assembly 604 and the melted deposition material between the top surface of the workpiece 650 and the nozzle assembly 604 at a to a desired temperature. Specifically, in some circumstances, the melted deposition material may cool down relatively rapidly once it exits the nozzle assembly 604 and contacts the workpiece 650, which may jam or clog the nozzle assembly 604 and thereby prevent the deposition material filament to be further dispensed. Heating the workpiece 650, the nozzle assembly 604 and/or the melted deposition material between the top surface of the workpiece 650 and the nozzle assembly 604 to the desired temperature reduces the temperature difference between the melted deposition material and the workpiece 650 or at least a top surface of the workpiece 650, and therefore may delay the hardening of the melted deposition material and prevent the deposited material from clogging the nozzle assembly 604. Furthermore, by heating, the workpiece heating mechanism 610 could further promote adhesion between the additive material layer formed by the melted deposition material and the top surface of the workpiece 650.

In one embodiment, the workpiece heating mechanism 610 includes a platform heater, not shown, operatively connected to the platform 602 for heating the platform 602, which in turn transfers heat to the workpiece 650 by conduction. Alternatively, the workpiece heating mechanism 610 may not include a platform heater.

In the embodiment illustrated in FIG. 6, the workpiece heating mechanism 610 further includes an electrical current source 612 operatively connected to the nozzle assembly 604 and to the platform 602. Specifically, the nozzle assembly 604 may include a nozzle 614 and a susceptor sleeve 616 made of a metal or a metal alloy such as stainless steel. As explained above, in one embodiment, the nozzle assembly 604 may not include the susceptor sleeve 616 and could include only the nozzle assembly 604. In this embodiment the nozzle 614 is made of a metal or a metal alloy.

In the embodiment illustrated in FIG. 6, the platform 602 is further made of a metal or a metal alloy and the deposition material forming the workpiece 650 is also made of a metal or a metal alloy. Since the platform 602, the susceptor sleeve 616 and/or the nozzle 614 and the workpiece 650 are made of metal, a closed electrical circuit is formed through the electrical current source 612, the platform 602, the workpiece 650 and the susceptor sleeve 616 and/or the nozzle 614 to thereby heat the melted deposition material and the top surface of the workpiece 650 through resistive heating.

In one embodiment, the electrical current source 612 may be configured to generate a DC current or an AC current of about between 500-3000 A RMS, and may be controlled by pulse width modulation (PWM) or by amplitude modulation.

Moreover, the nozzle 614 may be sized and shaped to substantially minimize the resistive heating within the nozzle 614 while maximizing the resistive heating within the workpiece 650 and in the additive material layer between the workpiece 650 and the nozzle 614.

For example, in an embodiment in which the nozzle 614 is made of titanium and the electrical current source 612 is configured to provide at least 500 A, the diameter of the nozzle 614 may be at least 6 mm to minimize heating of the nozzle, particularly in or around the annular grooves 354. In this configuration, the electrical current source 612 may provide about 25 W of heating when the distance between the nozzle 614 and the workpiece 650 is about 0.2 mm.

It will further be appreciated that in addition to the workpiece heating mechanism 610 described above, the ultrasonic waves generated by the ultrasonic wave generator may further contribute to locally heating the top surface of the workpiece 650.

In one embodiment, the electrical current necessary to heat the top surface of the workpiece 650, the nozzle assembly 604 and/or the melted deposition to the desired temperature may be determined according to the thermal mass of a portion of the workpiece 650 located below the melted deposition material. Specifically, a portion of the workpiece 650 which has a higher thermal mass and is therefore able to store more heat, such as a solid structure, may require a higher electrical current to account for the dissipation of heat from the melted deposition material and the top surface of the workpiece 650 throughout the workpiece 650, while a portion of the workpiece 650 which has a lower thermal mass and is therefore able to store less heat, such as an overhang near an edge of the workpiece, may require a lower electrical current or no electrical current at all. It will be appreciated that various other factors may also be considered to determine the electrical current necessary to heat the top surface of the workpiece 650, the nozzle assembly 604 and/or the melted deposition to the desired temperature.

Although in the embodiment illustrated in FIG. 6, the electrical current source 612 is directly connected to the nozzle assembly 604, in an alternative embodiment, the electrical current source 612 could instead be connected indirectly to the nozzle assembly 604. More specifically, the ultrasonic wave generator 608 could include an ultrasonic horn similar to the ultrasonic horn 110 which would be disposed between the nozzle assembly 604 and an ultrasonic transducer and would contact the nozzle assembly 604. The ultrasonic horn 110 may be made of an electrically conductive material such as aluminium or an aluminium alloy and the electrical current source 612 could be operatively connected to the ultrasonic horn to thereby form a closed electrical circuit through the electrical current source 612, the ultrasonic horn, the nozzle assembly 604, the workpiece 650 and the platform 602.

In one embodiment, the ultrasonic horn could further be supported by an ultrasonic mount which could include one or more clamps connected to the ultrasonic horn and one or more shock-mounted supports connected to the clamps to substantially vibrationally isolate the clamps and the ultrasonic horn. In this configuration, the clamps and the shock-mounted supports could further be made of an electrically-conductive material such as a metal and be in contact with the ultrasonic horn. The electrical current source 612 could therefore be operatively connected to at least one of the shock-mounted supports to thereby form a closed electrical circuit including the electrical current source 612, the shock-mounted supports, the clamps, the ultrasonic horn, the nozzle assembly 604, the workpiece 650 and the platform 602. It will be appreciated that other configurations including more or less elements is possible, as long as a closed electrical circuit is formed between at least the electrical current source 612, the nozzle assembly 604 and the workpiece 650.

Figure 7:
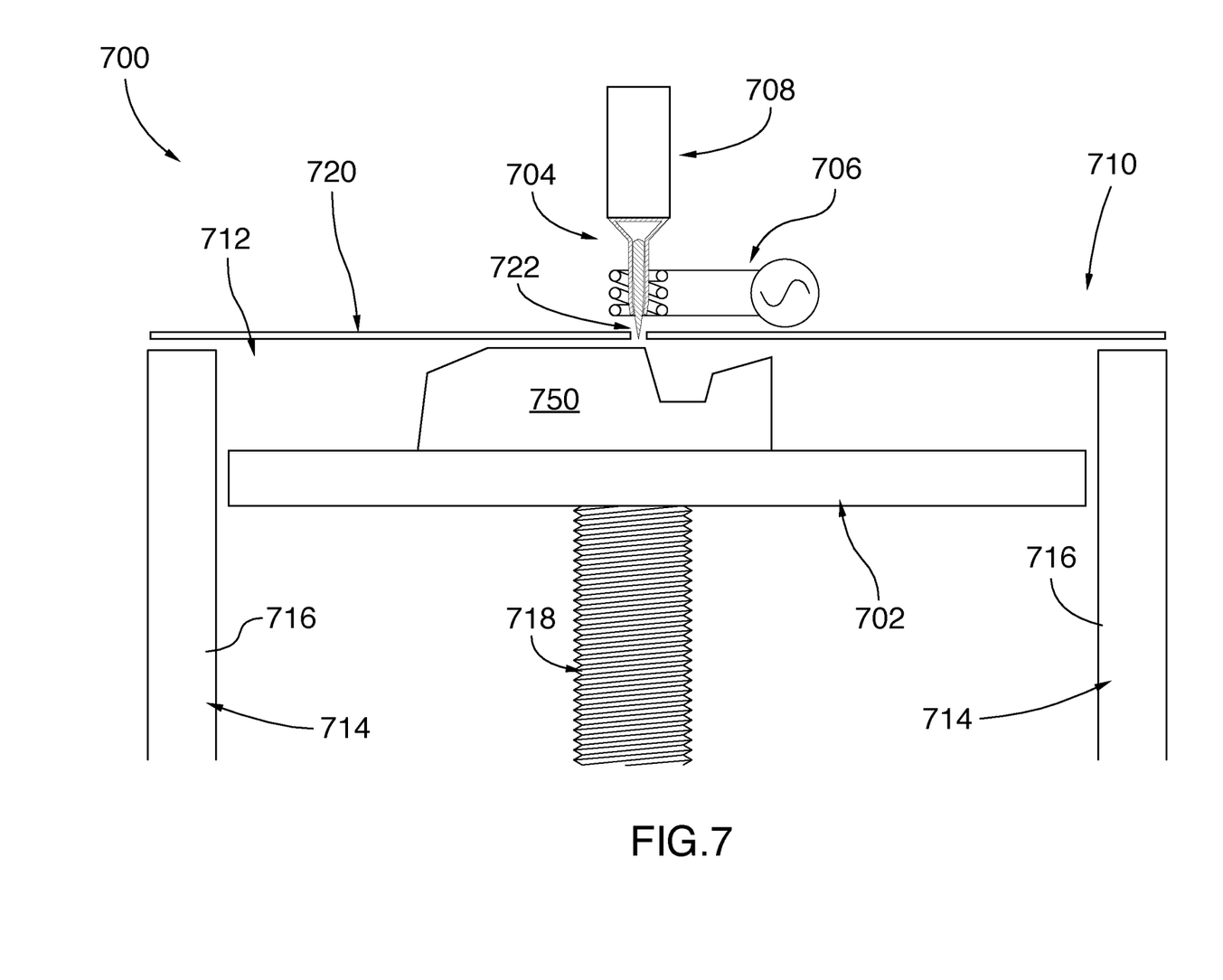
FIG. 7 is a schematic drawing showing an additive manufacturing system, in accordance with yet another embodiment, including an insulated heated chamber for heating the workpiece.

Referring now to FIG. 7, there is provided an additive manufacturing system 700, in accordance with still another embodiment.

In this embodiment, the additive manufacturing system 700 includes a platform 702 for supporting the workpiece 750, a nozzle assembly 704 for dispensing a deposition material filament towards the workpiece 750, a heat source 706 operatively coupled to the nozzle assembly 704 for melting the deposition material filament onto the workpiece 750 and an ultrasonic wave generator 708 coupled to the nozzle assembly 704 to generate ultrasonic waves and provide the ultrasonic waves into the melted deposition material.

Similarly to the additive manufacturing system 600 illustrated in FIG. 6, the additive manufacturing system 700 also includes a workpiece heating mechanism 710. In this embodiment, the workpiece heating mechanism 710 includes an insulated heated chamber 712 adapted to receive the workpiece 750. More specifically, the insulated heated chamber 712 includes a thermally-insulated sidewall 714 which includes a plurality of vertical wall panels 716 disposed around the platform 702. In this configuration, the platform 702 defines a floor of the insulated heated chamber 712.

In the embodiment illustrated in FIG. 7, the system 700 further includes a platform actuator 718 operatively connected to the platform 702 for moving the platform 702 vertically. As the system 700 is operated and additional additive material layer are added on the workpiece 750 on top of each other to provide the workpiece 750 with a desired shape and thereby create a three-dimensional object, the platform 702 is moved away from the nozzle assembly 704 such that the top surface of the workpiece 750 remains substantially at the same distance from the nozzle assembly 704. In this embodiment, the thermally-insulated sidewall 714 is stationary and the platform 702 moves relative to the sidewall 714, such that the insulated heated chamber 712 expands as additional additive material layers are added on the workpiece 750.

Still referring to FIG. 7, the insulated heated chamber 712 further includes a roof panel 720 which extends generally horizontally above the thermally-insulated sidewall 714. The roof panel 720 includes a nozzle opening 722 adapted to allow the nozzle assembly 704 access the interior of the insulated heated chamber 712.

In the illustrated embodiment, the platform 702 is movable vertically (i.e. along a "Z-axis") but is prevented from moving horizontally. To dispense the deposition material so as to form an additive material layer having a desired shape or pattern, the nozzle assembly 704 is operatively coupled to a nozzle displacement mechanism which moves the nozzle horizontally (i.e. along an "X-axis" and a "Y-axis").

To allow horizontal movement of the nozzle assembly 704, the roof panel 720 is movable relative to the platform 702 and to the thermally-insulated sidewall 714. Specifically, the roof panel 720 may be of sufficient length and width to still cover the top of the insulated heated chamber 712 when the nozzle assembly 704 is moved horizontally.

Alternatively, the platform 702 and the thermally-insulated sidewall 714 may be configured to move horizontally, while the nozzle assembly 704 remains stationary. In yet another embodiment, the nozzle assembly 704 and the roof panel 720 may move vertically while the platform 702 is prevented from moving vertically, or each of the nozzle assembly 704 and the platform 702 may be configured to move both vertically and horizontally.

The insulated heated chamber 712 is further heated to thereby heat the workpiece 750 within the chamber. In one embodiment, the insulated heated chamber 712 could be heated by heating the platform 702, which in turn heats the workpiece 750 and the air or gas inside the chamber 712. Alternatively, the insulated heated chamber 712 could be heated and maintained at a predetermined temperature by injecting hot air or gas into the chamber 712.

In an alternative embodiment, instead of extending through a nozzle opening in the roof panel 720, the entire nozzle assembly 704 may be located within the insulated heated chamber 712. In this embodiment, the nozzle assembly 704 may be received in one or more flexible high temperature bellow which would protect the nozzle assembly 704 and the nozzle displacement mechanism from the heat inside the insulated heated chamber 712 while allowing movement of the nozzle assembly 704 relative to the platform 702.

Additionally, the system 700 could further include an electrical current source, similarly to the system 600 illustrated in FIG. 6, configured for creating a closed electrical circuit through the platform 702, the workpiece 750 and the nozzle assembly 704.

It will be appreciated that the systems 100, 400, 500, 600, 700 described above further allow different materials to be deposited onto each other and bonded together. For example, the deposition material could include an aluminium alloy bonded on a top surface of a workpiece made of stainless steel. Various other combinations are also possible.

The invention claimed is:

1. A manufacturing system comprising:
a deposition material;
a deposition material feeder;
a nozzle having a nozzle sidewall defining a channel for allowing the deposition material to be dispensed through the channel onto a workpiece;
a heat source operatively coupled to the nozzle for melting the deposition material dispensed through the nozzle to form an additive material layer on a surface of the workpiece;
an ultrasonic wave generator operatively coupled to the nozzle for providing ultrasonic waves into the melted deposition material
wherein the ultrasonic wave generator is positioned so as to provide the ultrasonic waves into the melted deposition material in a direction substantially perpendicular to the movement plane; and
a controller operative to control the deposition material feeder, the heat source and the ultrasonic wave generator to cause a melt pool of the deposition material to form on a surface of the workpiece and to cause cavitation within the melt pool in order to wet and form bonds between the melted deposition material and the workpiece to manufacture the workpiece.

2. The system as claimed in claim 1, wherein the deposition material is made of one of a metal and a metal alloy.

3. The system as claimed in claim 1, further comprising a displacement mechanism for providing relative movement between the nozzle and a workpiece including movement in a movement plane, wherein said controller is operative to control the deposition material feeder, the displacement mechanism, the heat source and the ultrasonic wave generator to cause a melt pool of the deposition material to form on a surface of the workpiece and to cause cavitation within the melt pool in order to wet and form bonds between the melted deposition material and the workpiece and to move the nozzle while dispensing the deposition material to manufacture the workpiece.

4. The system as claimed in claim 1, wherein the ultrasonic wave generator further comprises an ultrasonic transducer and an ultrasonic horn having a first end operatively connected to the ultrasonic transducer and a second end operatively connected to the nozzle to allow the ultrasonic transducer to provide ultrasonic waves into the melted deposition material through ultrasonic horn and through the nozzle.

5. The system as claimed in claim 1, wherein the heat source comprises a magnetic flux source and the nozzle includes at least one groove extending inwardly into the nozzle from an outer surface of the nozzle to direct eddy currents induced by the magnetic flux source away from an outer surface of the nozzle to be closer to the channel.

6. The system as claimed in claim 5, wherein the magnetic flux source comprises a coil surrounding a sidewall of the nozzle and the at least one groove includes a plurality of spaced-apart annular grooves disposed concentrically about a longitudinal axis of the nozzle.

7. The system as claimed in claim 5, wherein the magnetic flux source is arranged to direct magnetic flux across a sidewall of the nozzle and the at least one groove includes a plurality of spaced-apart longitudinal grooves extending generally parallel to a longitudinal axis of the nozzle.

8. The system as claimed in claim 5, wherein the nozzle forms part of a nozzle assembly including the nozzle and a susceptor sleeve coupled to the heat source, the susceptor sleeve being disposed around the nozzle and in contact with the nozzle to transfer heat by conduction to the deposition material within the channel through the nozzle sidewall.

9. The system as claimed in claim 1, wherein the heat source includes a magnetic flux concentrator comprising:
a penannular core member having first and second ends spaced apart to define a gap therebetween, the core member being disposed such that the nozzle is received within the gap; and
a coil disposed around the core member.

10. The system as claimed in claim 1, wherein the heat source includes an induction coil disposed concentrically around the nozzle.

11. The system as claimed in claim 1, further including a platform for supporting the workpiece and a platform actuator operatively connected to the platform for selectively moving the platform vertically towards and away from the nozzle.

12. The system as claimed in claim 1, further comprising a workpiece heater for heating the workpiece to delay hardening of the melted deposition material and thereby prevent the deposited material from clogging the nozzle.

13. The system as claimed in claim 12, wherein the workpiece heater includes an insulated heated chamber having a thermally-insulated sidewall extending generally vertically around a workpiece supporting platform and a thermally-insulated roof panel extending generally horizontally with respect to the thermally-insulated sidewall, the roof panel including a nozzle opening adapted to allow the nozzle to access the interior of the insulated heated chamber.

14. The system as claimed in claim 12, wherein said heater provides hot air or gas.

15. The system as claimed in claim 1, wherein the deposition material is a metal matrix composite (MMC) including a mix of a metal and a non-metallic material, the ultrasonic wave generator being configured for providing the ultrasonic waves such that the ultrasonic waves allow the non-metallic material to be wetted by the metal to homogeneously bond the non-metallic material and the metal together.

16. The system as claimed in claim 1, wherein the ultrasonic wave generator is directly coupled to the nozzle sidewall.

17. The system as claimed in claim 1, wherein the movement plane is substantially parallel to the surface of the workpiece.

18. An additive manufacturing system comprising:
a deposition material feeder;
a nozzle having a nozzle sidewall defining a channel for allowing a deposition material to be dispensed through the channel on a workpiece;
a displacement mechanism for providing relative movement between the nozzle and a workpiece including movement in a movement plane;
a heat source operatively coupled to the nozzle for melting the deposition material dispensed through the nozzle to form an additive material layer on a top surface of the workpiece with an oxide layer thereby forming around the melted deposition material; and
a wave generator for providing acoustic waves into the melted deposition material to cause cavitation within the melted deposition material in order to wet and form bonds between the melted deposition material and the workpiece and to break up the oxide layer around the melted deposition material to further promote bonding of the additive material layer to the workpiece;
a workpiece heater for heating the workpiece to delay hardening of the melted deposition material and thereby prevent the deposited material from clogging the nozzle, the workpiece heater comprising an insulated heated chamber having a thermally-insulated sidewall extending generally vertically around a workpiece supporting platform and a thermally-insulated roof panel extending generally horizontally with respect to the thermally-insulated sidewall, the roof panel including a nozzle opening adapted to allow the nozzle to access the interior of the insulated heated chamber;
wherein the nozzle is movable relative to the workpiece along a movement plane,
wherein the wave generator is positioned so as to provide the acoustic waves into the melted deposition material in a direction substantially perpendicular to the movement plane; and
a controller operative to control the deposition material feeder, the nozzle displacement mechanism, the heat source and the wave generator to cause a melt pool of the deposition material to form on a surface of the workpiece and to cause cavitation within the melt pool in order to wet and form bonds between the melted deposition material and the workpiece and to move the nozzle while dispensing the deposition material to manufacture the workpiece.

19. An additive manufacturing system comprising:
a deposition material feeder;
a nozzle having a nozzle sidewall defining a central channel for allowing a deposition material to be dispensed therethrough along a deposition axis onto a workpiece;
a displacement mechanism for providing relative movement between the nozzle and a workpiece including movement in a movement plane;
a heat source operatively coupled to the nozzle for melting the deposition material dispensed through the nozzle to form an additive material layer on a top surface of the workpiece with an oxide layer thereby forming around the melted deposition material; and
an ultrasonic wave generator for providing ultrasonic waves along an ultrasonic axis, the ultrasonic wave generator being positioned such that the deposition axis and the ultrasonic axis are substantially parallel to each other to cause cavitation within the melted deposition material in order to wet and form bonds between the melted deposition material and the workpiece; and
a controller operative to control the deposition material feeder, the nozzle displacement mechanism, the heat source and the ultrasonic wave generator to cause a melt pool of the deposition material to form on a surface of the workpiece and to cause cavitation within the melt pool in order to wet and form bonds between the melted deposition material and the workpiece and to move the nozzle while dispensing the deposition material to manufacture the workpiece.

20. The system as claimed in claim 19, further comprising a workpiece heater providing hot air or gas.

21. A manufacturing method for manufacturing a workpiece comprising:
    dispensing a deposition material through a channel of a nozzle;
    heating the deposition material inside the nozzle to melt the dispensed deposition material;
    dispensing the melted deposition material to form a melt pool on a surface of the workpiece to form an additive material layer on the workpiece while moving the workpiece in a movement plane;
    providing ultrasonic waves into the melt pool in a direction substantially perpendicular to the movement plane to cause cavitation within melt pool of the melted deposition material in order to wet and form bonds between the melted deposition material and the workpiece; and
    continuing to move the nozzle while dispensing the deposition material to manufacture the workpiece.

22. The method as claimed in claim 21, further comprising heating at least one of the top surface of the workpiece, the nozzle and the melted deposition material between the top surface of the workpiece and the nozzle at a desired temperature to delay the hardening of the melted deposition material.

23. The method as claimed in claim 21, wherein heating the deposition material includes heating a susceptor sleeve disposed around the nozzle and in contact with the nozzle to transfer heat by conduction to the deposition material within the central channel through a nozzle sidewall of the nozzle.

24. The method as claimed in claim 21, wherein the deposition material is a metal matrix composite (MMC) including a mix of a metal and a non-metallic material, and further wherein providing the ultrasonic waves such that the ultrasonic waves allow the non-metallic material to be wetted by the metal to homogeneously bond the non-metallic material and the metal together.

25. The method as claimed in claim 21, wherein the melted deposition material is metal or a metal alloy, and said cavitation in the melt pool breaks up the oxide layer around the melted deposition material.

26. The method as claimed in claim 21, wherein heating the deposition material includes providing a magnetic flux to induce eddy currents in the nozzle, wherein the nozzle includes at least one groove extending inwardly into the nozzle from an outer surface of the nozzle to direct the eddy currents induced by the magnetic flux away from an outer surface of the nozzle to be closer to the channel.

27. The method as claimed in claim 21, further comprising supporting the workpiece in an insulated heated chamber.

28. The method as claimed in claim 22, wherein said heating comprises using hot air or gas.

* * * * *